F. W. KREMER.
TIRE AND METHOD OF MAKING THE SAME.
APPLICATION FILED JAN. 31, 1918.
1,263,681.
Patented Apr. 23, 1918.
3 SHEETS—SHEET 3.
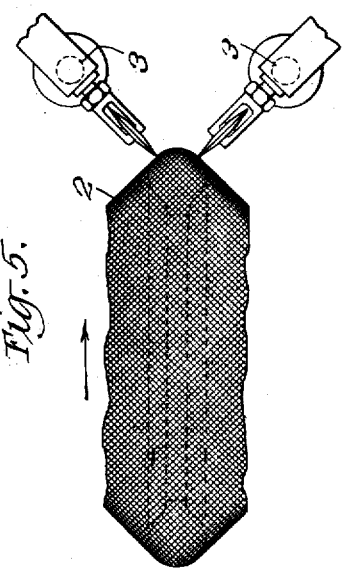
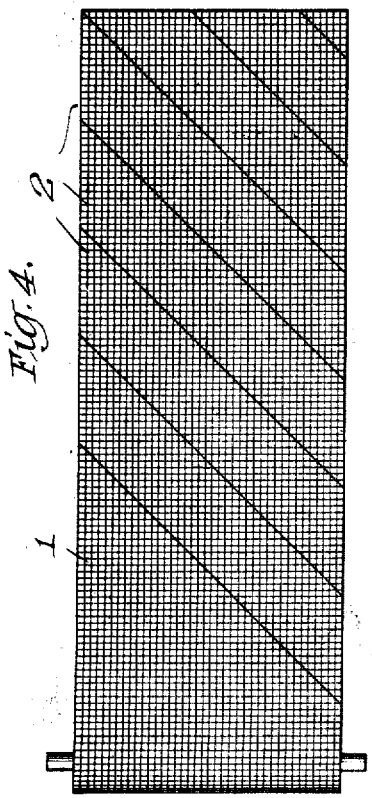
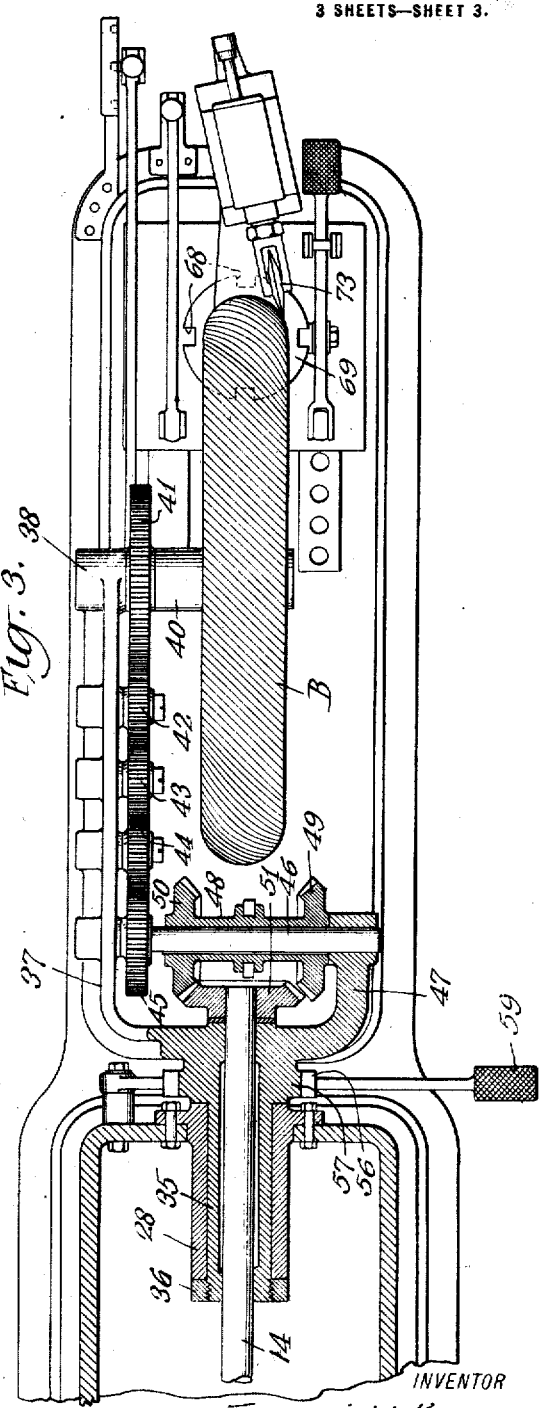
INVENTOR
Franklin W. Kremer
BY
Burger & Clarke
ATTORNEYS

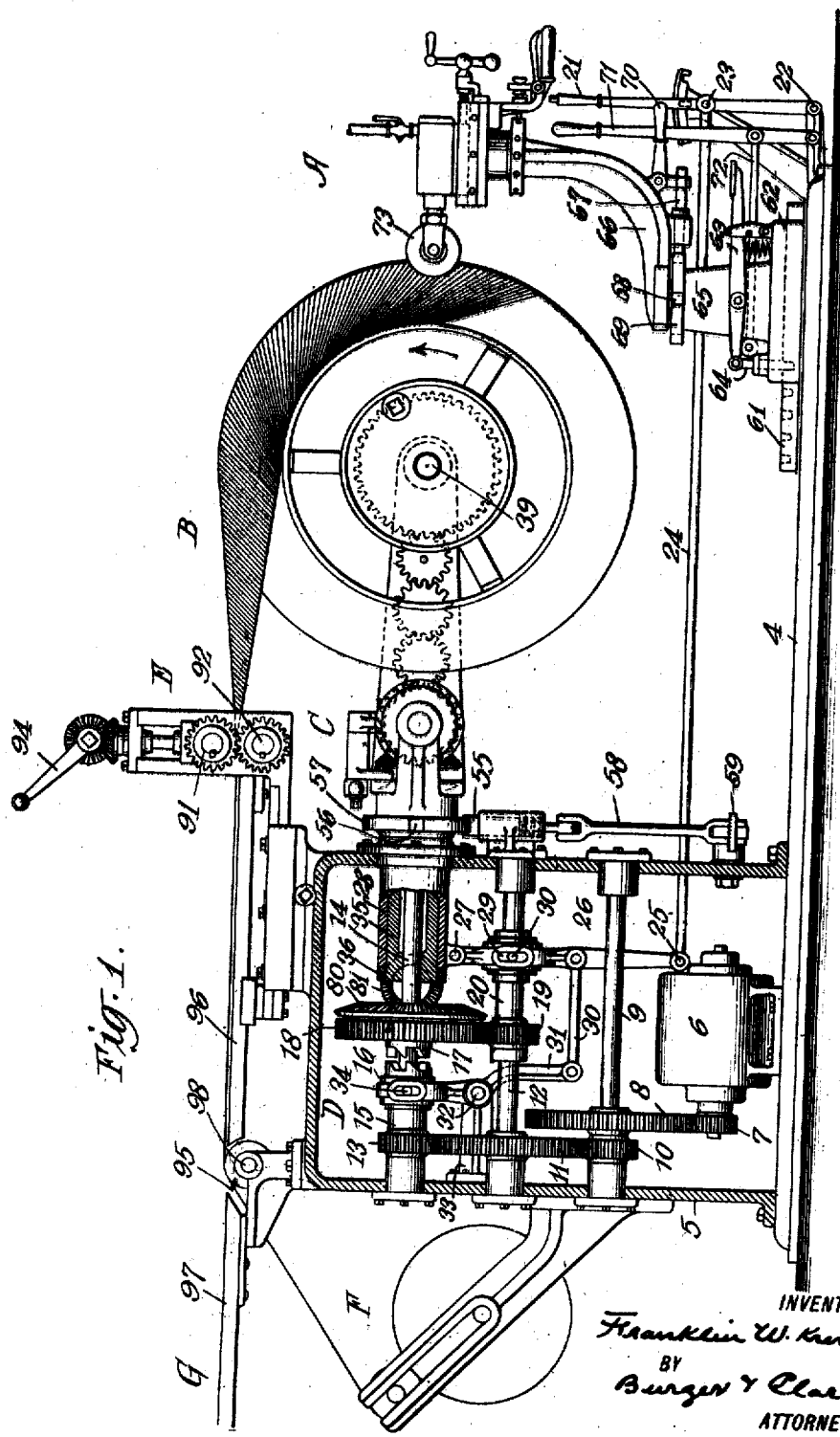

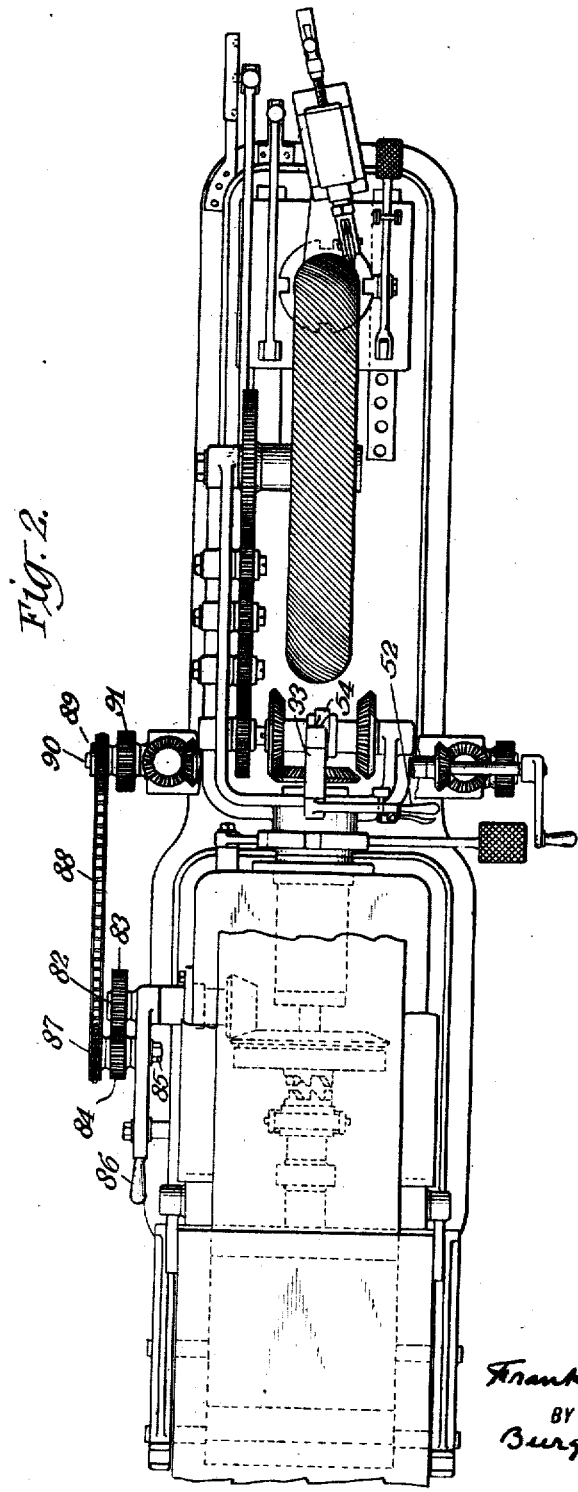

UNITED STATES PATENT OFFICE.

FRANKLIN W. KREMER, OF RUTHERFORD, NEW JERSEY.

TIRE AND METHOD OF MAKING THE SAME.

1,263,681.  Specification of Letters Patent.  Patented Apr. 23, 1918.

Application filed January 31, 1918.  Serial No. 214,667.

*To all whom it may concern:*

Be it known that I, FRANKLIN W. KREMER, a citizen of the United States, residing at 8 East Newell avenue, Rutherford, county of Bergen, and State of New Jersey, have invented a new and useful Improvement in Tires and Methods of Making the Same, of which the following is a specification.

This invention relates to a method of, and apparatus for, manufacturing tires, and to a new and improved tire made thereby.

Two broad methods of manufacturing tires have been particularly developed in recent years in the art. The first method is for making fabric tires, and the second is for making cord tires.

Fabric tires are constructed by superposing layers of rubberized fabric, cut on the bias, upon each other on a suitable core. These fabric tires in recent years have been largely constructed on tire machines which are provided with means for spinning down the sides of the fabric around the core during the rapid rotation of the core.

Cord tires are constructed on a core by weaving cords backward and forward on the core or entirely around the core. Sometimes the cords are applied to the core one strand at a time. In other cases, a number of strands of cord are held in parallelism with each other by relatively weak binding or cross-threads.

Both the fabric and the cord tires have certain advantages and disadvantages.

The principal advantage of the fabric tire is that it is easily and quickly built by machine methods, and is sufficiently strong for general purposes. One of the disadvantages of the fabric tire, as developed by recent experience, is that in a very high percentage of instances it blows out along one side of the tire, these blow-outs showing a tendency to appear on the same side of large numbers of tires.

The cord tire is strong and durable and is used under circumstances making more than ordinary demands upon the tire. Its disadvantages are that heretofore it has been almost, if not quite, impossible to make at least the multo-cord tire by machine, and in all cord tires the construction has been more intricate and slower, and generally more expensive than with fabric tires.

I have made certain discoveries which enable me to increase the advantages and decrease the disadvantages in the manufacture of both fabric and cord tires by machine. I have discovered the source of the weakness on one side of the fabric tires, and have devised means for overcoming that weakness, which means are also adapted for the manufacture of cord tires by machine methods.

In order to understand the nature of these discoveries and of the means devised for overcoming the disadvantages in the machine-manufacture of fabric and cord tires, it is necessary to consider the nature of the fabric from which the ordinary fabric tire is constructed. This fabric is a strong woven fabric made up of the warp threads which in the weaving operation are held under tension, and the weft or non-tension threads which are shuttled back and forth through the warp threads. The tension of the fabric resides in the warp threads, and I have discovered that it is the improper application of these warp threads to the core in the machine manufacture of tires which is responsible for the high percentage of breaks in one side of the tire, and by overcoming this improper application of the warp threads, I am enabled to eliminate this weakness in one side of the tire, and thus largely increase the wearing qualities of the fabric tire.

As a preliminary to applying the fabric to the core, it is cut on the bias in narrow strips, the object being to provide a lazy-tong arrangement of the warp and weft threads which will enable them to be easily and quickly molded into a trough shape on the core, and thus worked down around the sides of the core. I have discovered that the ordinary tire machine spins down the warp threads of the fabric properly on one side of the rotating core and improperly on the other side. The reason for this is that while the spinner on one side of the tire stretches, works or spins down the warp threads in a direction lengthwise thereof, so as to preserve and even increase the tension of the thread, the spinning devices on the opposite side serve, by reason of the relative movement of the rotating core and the spinner, to exert such action on the warp threads as not to preserve their tension, and as even to tend to lessen the tension by slightly deflecting the warp threads in a direction opposite to the rotation of the core.

I have also discovered that it is this same opposition or disharmony between the diagonal direction at which the warp or tension threads cross the core, thus causing the spinning devices on one side of the tire to act properly, and those on the opposite side to act improperly, which interferes in a practical way with the manufacture of cord tires by machine methods, and by overcoming this disharmony, I am, as above stated, not only able to eliminate the weakness in the fabric tire, but also to provide for the machine manufacture of cord tires.

The nature of my discoveries and invention will be made clear by the following description in connection with the accompanying drawing forming part of this specification, it being understood that the particular embodiment of machine, method and tire, as hereinafter disclosed, is merely intended to illustrate one means of carrying out the invention, and that the combination and arrangement of parts, as hereinafter disclosed, may be altered in many ways within the scope of the claims and as indicated by the variations in the claims, without departing from the spirit of the invention.

Figure 1 is a side view, partly in elevation and partly in section, of a tire machine constructed in accordance with my invention.

Fig. 2 is a plan view of the apparatus.

Fig. 3 is a plan view, partly in horizontal section, of the core reversing and spinning mechanism.

Fig. 4 is a view showing the method of cutting the fabric on the bias.

Fig. 5 is a view illustrating the method of spinning down the sides of the fabric on the core.

Like reference numerals indicate corresponding parts in the different figures of the drawing.

Referring to Fig. 4, the strip of fabric 1, having the warp or tension threads extending lengthwise thereof, is cut on the bias into a series of strips 2. These strips are laid lengthwise on a core such as is shown in Fig. 5, with the result that both the warp and the weft threads of the fabric extend diagonally on the core. In the ordinary manufacture of fabric tires, spinning devices 3, diagrammatically illustrated in Fig. 5, are employed for spinning down or shaping the sides of the fabric to and around the core. The core is rotated in the direction of the arrow, and by assuming that in Fig. 5 the warp threads are those which begin at the bottom of the figure and extend upward and to the right of the figure on a diagonal line, it will be seen that only the lower of the two spinning devices 3, is in a position to spin down the warp threads in such manner as to preserve their tension and proper position on the tire. It will also be seen that the upper spinner 3 in Fig. 5, when combined with the fact that the upper portion of the core is rotating in the direction of the arrow, really acts sidewise of the warp threads instead of lengthwise thereof. In short, the warp threads are brushed along sidewise beneath the spinner, which acts to deflect said threads slightly in a rearward direction and in nowise serves to place said warp threads under the same tension as the spinner acting on the other side of the tire. It is this fact, namely that the warp threads on one side of the median line of the core extend diagonally rearward of the line of movement of the rotating core, and that on the opposite side of the tire they extend diagonally forward of the line of movement, that I attribute the weakness on one side of fabric tires. This weakness I have found develops on that side of the tire in which the warp threads extend diagonally forward, with the result that the spinning mechanism tends not only to prevent them from having the same tension as the rearwardly extending warp threads on the opposite side, but even to decrease the tension of the warp threads by serving relatively to brush them rearward and a little to one side. The deflection itself is very slight, but the fact of there being no tension of the warp threads on one side of the tire, produces the great element of weakness to which I refer.

The broad means which I have devised for overcoming this defect in the manufacture of tires, consists in the embodiment shown in employing one of the spinners 3, such as that shown at the bottom of Fig. 5. This spinner is used so long as the core rotates in the direction of the arrow, for the purpose of spinning down the lower half of the fabric in Fig. 5. I then reverse the rotation of the core. This causes the upper half of the warp threads in Fig. 5 to extend diagonally rearward of the line of rotation of the core, and I can then properly spin down the upper half of the core. It will be obvious that this same method and machine can be used for spinning down opposite sides of a tire made from cord or cord fabric. Such machine spinning has not heretofore been possible with cord fabric, by reason of the fact that the spinner on one side would deflect the cords and spin them down without putting them under tension.

The machine by which the foregoing results are accomplished will now be specifically described:

This machine comprises a suitable base 4, on which is mounted the spinning mechanism indicated generally by A, the rotary core B, the mechanism for reversing the rotation of the core and for swinging or rotating it around an axis at a right angle to its axis of rotation indicated by C, the mechanism for driving the core B forward at fast and slow speeds D, the tension mechanism for feeding the fabric under the proper tension E, the reel from which the fabric is fed F, and the table on which the fabric is made up when the reel is not used G.

The driving mechanism D is mounted in a suitable casing 5, and comprises a motor or other source of energy 6, provided with a pinion 7, which drives at a reduced speed a large gear wheel 8, mounted upon a main drive shaft 9, which is suitably journaled in the frame 5, and is fixed thereon a pinion 10, which drives a gear wheel 11, fixed on a slow shaft 12. The fixed gear 11 is in gear with a pinion 13, which runs loosely on a fast driving shaft 14. The shaft 14 drives the core B through suitable gearing to be hereinafter described. The pinion 13 is fixed on a sleeve 15, which has feathered or splined thereon a clutch 16, capable of sliding into and out of engagement with a combination clutch 17, connected with a gear wheel 18, fixed on the shaft 14, and in mesh with a pinion 19, which is fixed on a sleeve 20, which in turn is splined or feathered on the shaft 12.

The mechanism by which the clutch member 16 can be engaged with the clutch member 17, at the same time that the pinion 19 is moved out of gear with the gear wheel 18, and vice versa, consists of a lever handle 21, which is disposed near the spinning mechanism and is fulcrumed at 22. Pivotally connected with the lever 21 at 23 is a connecting rod 24, which is pivotally connected at 25 with a shifting lever 26, fulcrumed at 27 on the stationary bearing sleeve 28 in which, as hereinafter described, the mechanism for rotating the supporting frame for the core B is mounted. The shifting lever 26 is provided with a slot 29 engaging a pin 30, by means of which the sleeve 20, carrying the pinion 19 is moved longitudinally on its spline. Connected with the shifting lever 26 is a connecting rod 30, which operates a lever 31, fulcrumed at 32, upon a bracket 33, and engaging at its upper end a pin 34, by which the clutch member 16 is shifted into and out of engagement with the clutch member 17. By throwing the handle 21 in one direction, the pinion 19 slides out of engagement with the gear 18, and the clutch 16 engages the clutch 17, with the result that the drive shaft 14 is rotated rapidly, for spinning down the fabric on the core B. By moving the handle 21 in the opposite direction, the clutches 16 and 17 are disengaged and the pinion 19 is moved into gear with the wheel 18, with the result that the shaft 14 is driven in the same direction but at a slower rate of speed for the purpose of drawing the strips of fabric on to the core.

The mechanism by which the core B is rotated either forward or backward, and by which it is capable of turning on an axis at right angles to its axis of rotation, will now be described: This mechanism comprises a large stub shaft 35, mounted in the journal 28, and held therein by a sleeve or collar 36. The stub shaft 35, best shown in Fig. 3, carries at its outer end a rigid arm 37, having at its outer end a bearing 38, for the shaft 39, on which is rotatably mounted the core B. This core is provided with a hub or sleeve 40, having fixed thereon a gear wheel 41, in mesh with a train of gears 42, 43, 44 and 45, each mounted upward on a shaft carried by the arm 37. The gear wheel 45 is fixed on a shaft 46, which is journaled at one end in the arm 37, and at the other end in a short arm 47, carried by the stub shaft 35. Keyed or splined on the shaft 46 is a sleeve 48, having fixed thereon two oppositely facing beveled gears 49 and 50, capable of being alternately thrown into engagement with a beveled gear 51, which is fixed on the shaft 14. It will be remembered that this shaft 14 is capable of being driven forward at high and low speed. By moving the beveled wheel 49 into engagement with the beveled wheel 51 on the shaft 14, the core B is rotated in one direction, and by moving the beveled wheel 50 into engagement with the beveled wheel 51, at the same time disengaging the opposite bevel, the core is rotated in the opposite direction. The means for controlling the beveled wheels 49 and 50, consists of a handle or controlling lever 52 shown best in Fig. 2, which is journaled in a sleeve 54, and is provided with a fork 54, which engages the sleeve 48. The lever 52 is provided with a suitable latch. By raising the lever, the core is rotated in one direction, and by depressing it, the core is rotated in the opposite direction.

The core supporting arm 37 is normally locked against rotation on its axis or shaft 35 by means of a spring-operated bolt 55, best shown in Fig. 1. This bolt 55 is spring-pressed upward so as to lock into any one of four notches 56, cut into a flange 57, which is fixed on the shaft or axis 35 of the core frame. The spring-pressed bolt 55 is provided with a connecting rod 58, extending down to a foot treadle 59. By depressing the treadle 59, the bolt 55 is drawn downward, and the operator can then rotate the core-holding arm 37 on its axis 35.

The spinning mechanism A may be of any suitable form and construction. I prefer to mount it on a base 61, on which the pedestal 62 is capable of sliding back and forth and of being locked in any suitable position by a spring-controlled treadle 63, having a pin 64 which fits into any one of a number of sockets in the base 61, and is released by depressing the treadle with the foot. Mounted on the base 62 is a pedestal 65, on which the spinner supporting arm 66 is pivoted for rotation around a vertical axis. The spinner 66 is locked in any of the positions to which it has been rotated by means of a spring-operated bolt 67, which engages into notches 68, cut in a flange 69 fixed on the pedestal 65. The bolt 67 is released by means of a handle 70. The pedestal base 62 is moved back and forth by means of the lever handle 71, which is connected with the base 62 through the rod 72. The spinning mechanism carried by the arm 66, may be of any suitable type, which it is unnecessary to describe in detail further than to say that the reference numeral 73 indicated the spinning reel.

After the fabric has been fed on to the core B and is ready to be spun down, the core is rotated forward at a fast speed and the spinner 73 is held against that side of the fabric in which the warp threads extend diagonally rearward relative to the direction of movement of the core. When one side of the fabric has thus been spun down so as to maintain the proper position and tension of the warp threads, the core is stopped, the treadle 59 is depressed to unlock the core-holding arm, which is then rotated, so that it brings the opposite side of the core from that shown in Fig. 1, into position to be engaged by the spinner 73. The lever handle 52 is operated so as to reverse the rotation of the core, and the remaining side of the fabric is thus spun down in the proper way, to preserve or produce the necessary tension on the warp threads.

Instead of rotating the core frame 37 in order to bring the opposite side of the core against the spinner 73, I may accomplish the same result by moving the spinner 73 to the opposite side of the core B, and then reversing the direction of rotation of the core, or, as indicated in Fig. 5, I may employ two spinners 3—3. It is not possible, however, to employ both of these spinners at the same time. The lower spinner can be brought into operation when the core is traveling in the direction of the arrow. By then reversing the rotation of the core and withdrawing it, and employing only the upper spinner 3, the upper side of the fabric can be spun down in such manner as to preserve the tension on the warp threads. I prefer, however, to maintain the spinner or stitcher 73 on one side of the core, and to rotate the core-holding arm for the reason that this enables the operator to work with the fabric traveling toward him from above, instead of from below, and thus enables him to perform his work much more efficiently than would be possible by shifting the spinner to the other side of the core, and then rotating it backward.

The method of the present invention, as will be obvious, can also be carried out on a core which rotates in only one direction, by spinning down one side of the fabric and then removing the tire and reversing it and reapplying it to the core, so that the opposite side of the fabric can be spun down in the proper way. As before stated, however, the preferable and most practical method of carrying out the process is that which consists in employing a reversible core mounted on a reversible frame, as this method permits both sides of the fabric to be spun down easily and quickly in the proper way.

The tension mechanism E may be of any desired form and construction. As illustrated, it consists of a gear wheel 80, best shown in Fig. 1, which is fixed on the shaft 14, and meshes with a bevel gear 81 on a shaft 82, shown in Fig. 2. The shaft 82 has fixed thereon a gear wheel 83, which meshes with a gear wheel 84, mounted on a stub shaft 85, which is slidably adjusted in a slot in the lever 86, fulcrumed on the shaft 82. Different sizes of gear wheel 84 may be mounted on the slidable shaft 85, in such manner that no matter what the size of the gear 84 may be, it still meshes with the gear 83, and drives the tension and feed rollers. This form of gear has been patented to me in an earlier patent, and in its details forms no part of the present invention. The gear 84 drives a sprocket 87, which operates a sprocket chain 88, engaging a sprocket 89 on a shaft 90. Fixed on the shaft 90 is a gear wheel 91, which meshes with a lower gear wheel 92. The gear wheels 91 and 92 are duplicated on opposite sides of the machine, and serve to drive pressing rollers, which serve the double function of feeding the fabric at a predetermined speed relative to the slow-speed rotation of the core B, and yet grips said fabric so as to prevent it from slipping, and thus enable it to be put under the necessary tension. The upper feed roll is raised and lowered by means of the crank handle 94, and the gearing operated thereby. The details of this gearing form no part of the present invention.

The material to be fed through the feeding and tension mechanism E, may be delivered from the reel F, through a slot 95, and across the table 96. Sometimes, instead of feeding the fabric from the reel, it is preferable to make it up in the form of sheets on the table 97, which is hinged to the table 96, as shown at 98. The various plies of fabric are made up on the table 97, and are tacked together and fed through the feed and tension rolls to the core.

While I have described the manufacture of tires by spinning down the warp threads in such manner as to preserve the tension thereof, and while I prefer to follow this practice, nevertheless it is to be understood that I may select the weft threads for spinning down and in this case, I find that it is possible to put them under a considerable measure of tension by means of the spinning operation. The operation is the same as when spinning down the warp threads. The weft threads on one side are spun down. The core is flopped over and rotated in the opposite direction and the weft threads on the other side are spun down.

I claim as my invention:

1. As a new article of manufacture, a tire having the fabric worked down lengthwise of the warp threads on both sides of the median line of the tire.

2. As a new article of manufacture, a machine-made tire having the fabric spun down lengthwise of the warp threads on both sides of the median line of the tire.

3. As a new article of manufacture, a machine-made tire having its warp threads worked lengthwise thereof on both sides of the median line of the tire.

4. A method of manufacturing tires on a tire machine which consists in working down one side of the tire in the direction lengthwise of the warp or tension threads, reversing the core and rotating it in the opposite direction and spinning down the other side of the tire.

5. A method of manufacturing tires, which consists in working down the fabric lengthwise of the warp threads on both sides of the median line of the tire.

6. A method of manufacturing tires on a tire machine, which consists in rotating both sides of the tire in such direction that both sides of the warp or tension threads incline rearward relative to the direction of movement, and spinning down said warp threads.

7. A method of manufacturing tires which consists in selecting the warp or weft threads to be spun down, spinning down the selected threads on one side of the median line, so as to stretch them, and then separately spinning down the opposite side of the tire in an opposite direction, whereby to spin both sides of the tire uniformly.

8. As a new article of manufacture, a machine made tire having its principal cords spun down lengthwise thereof on both sides of the median line of the tire.

FRANKLIN W. KREMER.